United States Patent
Watanabe (10) Patent No.: US 12,306,150 B2
(45) Date of Patent: May 20, 2025

(54) SAMPLE MEASUREMENT DEVICE AND MEASUREMENT SAMPLE IDENTIFICATION METHOD

(71) Applicant: Shimadzu Corporation, Koyo (JP)

(72) Inventor: Satoru Watanabe, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 209 days.

(21) Appl. No.: 17/439,315

(22) PCT Filed: Dec. 25, 2019

(86) PCT No.: PCT/JP2019/050888
§ 371 (c)(1),
(2) Date: Sep. 14, 2021

(87) PCT Pub. No.: WO2020/194955
PCT Pub. Date: Oct. 1, 2020

(65) Prior Publication Data
US 2022/0155270 A1    May 19, 2022

(30) Foreign Application Priority Data
Mar. 22, 2019  (JP) .................. 2019-055567

(51) Int. Cl.
*G01N 30/86*   (2006.01)

(52) U.S. Cl.
CPC ..... *G01N 30/8631* (2013.01); *G01N 30/8679* (2013.01)

(58) Field of Classification Search
CPC ............... G01N 30/8631; G01N 30/02; G01N 30/8679; G01N 30/8637; G01N 30/8644
(Continued)

(56) References Cited

U.S. PATENT DOCUMENTS 5,203,992 A   4/1993   Drouen
5,209,853 A   5/1993   Lynch et al.
(Continued)

FOREIGN PATENT DOCUMENTS

EP   2270491 A1    1/2011
JP   H02-300660 A  12/1990
(Continued)

OTHER PUBLICATIONS

English translation of reference PCT/JP2018/044061 (WO 202110268), Nov. 29, 2018. (Year: 2018).*
(Continued)

*Primary Examiner* — Michael P Nghiem
(74) *Attorney, Agent, or Firm* — Muir Patent Law, PLLC (57) ABSTRACT

A sample measurement device (100) includes a measurement unit (10) configured to measure a sample containing a plurality of components according to a measurement condition (30) including a plurality of parameters (31), and a data processing unit (20) configured to acquire measurement data, and the data processing unit is configured to acquire a distribution (43) of a measurement quality indicator (42) according to the measurement condition based on the measurement data (40), and identify a peak (41) of each of the components in the measurement data based on the distribution of the measurement quality indicator and the parameters used when the sample is measured.

10 Claims, 7 Drawing Sheets

(58) Field of Classification Search
USPC .......................................................... 702/27
See application file for complete search history.

(56) References Cited

U.S. PATENT DOCUMENTS

| | | | | |
|---|---|---|---|---|
| 7,343,248 | B2* | 3/2008 | Parce | B01L 3/5027 702/19 |
| 10,697,946 | B2* | 6/2020 | Kamata | G01N 30/8651 |
| 2005/0233464 | A1 | 10/2005 | Compton et al. | |
| 2017/0052159 | A1* | 2/2017 | Harant | G01N 30/8693 |
| 2017/0322190 | A1 | 11/2017 | Nyholm et al. | |
| 2019/0162708 | A1* | 5/2019 | Yanagisawa | G01N 30/72 |
| 2020/0345252 | A1* | 11/2020 | Huijbregts | A61B 5/0245 |
| 2021/0109241 | A1* | 4/2021 | Wang | G01V 1/288 |
| 2021/0405002 | A1* | 12/2021 | Noda | G01N 30/8658 |

FOREIGN PATENT DOCUMENTS

| | | |
|---|---|---|
| JP | H03-035163 A | 9/1991 |
| JP | 2006-502414 A | 1/2006 |
| JP | 2017-534060 A | 11/2017 |
| WO | WO-2020110268 A1 * | 6/2020 ............. G01N 30/30 |

OTHER PUBLICATIONS

Notice of Reasons for Refusal dated May 31, 2022 for corresponding Japanese Patent Application No. JP 2021-508765, submitted with a machine translation.

Written Opinion by the International Search Authority for PCT application No. PCT/JP2019/050888 dated Mar. 24, 2020, submitted with a machine translation.

Fekete et al., "Rapid high performance liquid chromatography method development with high prediction accuracy, using 5 cm long narrow bore columns packed with sub-2μm particles and Design Space computer modeling," Journal of Chromatography A, 2009, vol. 1216, pp. 7816-7823.

* cited by examiner

FIG.10  IDENTIFICATION FLOW OF EACH COMPONENT

SAMPLE MEASUREMENT DEVICE AND MEASUREMENT SAMPLE IDENTIFICATION METHOD

TECHNICAL FIELD

The present invention relates to a sample measurement device and a measurement sample identification method.

BACKGROUND ART

Conventionally, a sample measurement device is known. Such a sample measurement device is disclosed in Japanese Translation of PCT International Application Publication No. 2006-502414, for example.

Japanese Translation of PCT International Application Publication No. 2006-502414 discloses a sample measurement device including a chromatography assembly that separates a sample into a plurality of aliquots (division units), a mass spectrometer assembly that obtains mass spectrometry of each aliquot, a UV detector assembly that further analyzes the plurality of aliquots, and a computer.

The chromatography assembly includes a stationary phase and a mobile phase, and separates each component contained in the sample based on a difference between the affinity of each component contained in the sample for the stationary phase and the affinity for the mobile phase. A component having a high affinity for the stationary phase is retained in the stationary phase for a longer period of time than a component having a high affinity for the mobile phase. That is, the chromatography assembly is configured to separate the sample into the plurality of aliquots based on a difference in the time (retention time) that the components contained in the sample are retained in the stationary phase. The device described in Japanese Translation of PCT International Application Publication No. 2006-502414 is configured to separate a peak of each component contained in the sample by the retention time.

PRIOR ART

Patent Document

Patent Document 1: Japanese Translation of PCT International Application Publication No. 2006-502414

SUMMARY OF THE INVENTION

Problem to be Solved by the Invention

When the peaks of the components contained in the sample are separated, it is difficult to separate the respective components when the positions of the peaks corresponding to the respective components overlap each other or are too close to each other. Therefore, although not described in Japanese Translation of PCT International Application Publication No. 2006-502414, it is conceivable to adjust the position of the peak by changing the conditions at the time of analysis in order to separate each component. However, it is unclear how the position of the peak changes when the analysis conditions are changed to adjust the position of the peak, and thus in order to identify which peak corresponds to which component, it is necessary for an inspector to compare actual data before and after the analysis conditions are changed. When the inspector identifies each component by comparing the actual data, accurate identification is difficult depending on the skill level of the inspector.

The present invention is intended to solve the above problem. The present invention aims to provide a sample measurement device and a measurement sample identification method capable of identifying the peaks of components contained in a sample regardless of the skill level of an inspector.

Means for Solving the Problem

In order to attain the aforementioned object, a sample measurement device according to a first aspect of the present invention includes a measurement unit configured to measure a sample containing a plurality of components according to a measurement condition including a plurality of parameters, and a data processing unit configured to acquire measurement data based on an output of the measurement unit. The data processing unit is configured to acquire a distribution of a measurement quality indicator according to the measurement condition based on the measurement data, and to identify a peak of each of the components in the measurement data based on the distribution of the measurement quality indicator and the parameters used when the sample is measured.

A measurement sample identification method according to a second aspect of the present invention includes acquiring measurement data obtained by measuring a sample containing a plurality of components according to a measurement condition including a plurality of parameters, acquiring a distribution of a measurement quality indicator according to the measurement condition based on the measurement data, and identifying a peak of each of the components in the measurement data based on the distribution of the measurement quality indicator and the parameters used when the sample is measured.

Effect of the Invention

As described above, the sample measurement device according to the first aspect of the present invention includes the measurement unit configured to acquire the distribution of the measurement quality indicator according to the measurement condition based on the measurement data, and to identify the peak of each of the components in the measurement data based on the distribution of the measurement quality indicator and the parameters used when the sample is measured. The measurement quality indicator is a value calculated based on the results obtained under a plurality of measurement conditions having different parameters in an analyzer, for example. The range of the parameters allowed by design in the distribution (response surface) of the measurement quality indicator is specified as the design space. The design space refers to the range of the parameters in which the allowable measurement quality is obtained (measurement quality is ensured) regardless of how the parameters are selected in combination. Therefore, the parameters are changed within the design space such that it is possible to examine the analysis conditions while ensuring the measurement quality. Therefore, it is possible to predict the peak position of each of the components in the measurement data based on the distribution of the measurement quality indicator and the parameters used when the sample is measured. Thus, even when the measurement condition is changed, the peak position of each of the components can be predicted. Consequently, the peak of each of the components can be identified based on the measurement condition, and thus the peak of each of the components contained in the sample can be identified regardless of the skill level of an inspector.

As described above, the measurement sample identification method according to the second aspect of the present invention includes identifying the peak of each of the components in the measurement data based on the distribution of the measurement quality indicator and the parameters used when the sample is measured. Accordingly, similarly to the sample measurement device according to the first aspect, it is possible to provide the measurement sample identification method capable of identifying the peak of each of the components contained in the sample regardless of the skill level of an inspector.

MODES FOR CARRYING OUT THE INVENTION

An embodiment embodying the present invention is hereinafter described on the basis of the drawings.

The configuration of a sample measurement device 100 according to the embodiment is now described with reference to FIGS. 1 to 9.

The sample measurement device 100 is a device that measures a sample according to a measurement condition 30 including a plurality of parameters 31 and acquires measurement data 40 based on the measurement results.

The sample measurement device 100 measures a sample containing a plurality of components, and provides the measurement data 40 obtained by the measurement, for example. The measurement of the sample is preferably performed under conditions in which each of the plurality of components can be separated.

A specific example of the sample measurement device 100 is now described.

Figure 1:
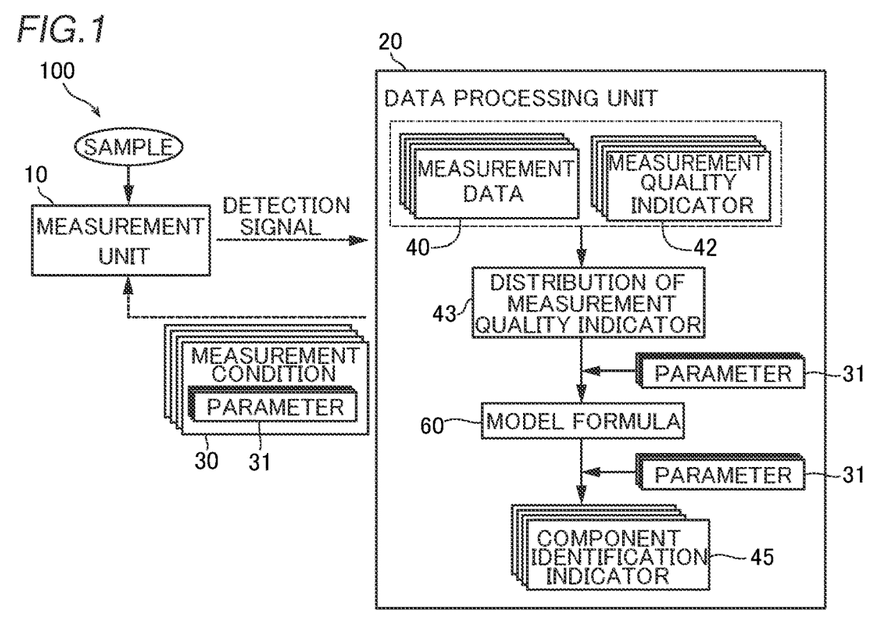
FIG. 1 is a block diagram schematically showing a sample measurement device according to an embodiment.

As shown in FIG. 1, the sample measurement device 100 includes a measurement unit 10 and a data processing unit 20. In the sample measurement device 100, the measurement unit 10 detects the components in the sample and the data processing unit 20 analyzes the output (detection signal) of the measurement unit 10. The measurement unit 10 measures the sample. Furthermore, the data processing unit 20 analyzes the measurement results (detection signals) of the measurement unit 10.

The measurement unit 10 measures the sample containing the plurality of components according to the measurement condition 30 including the plurality of parameters 31 based on a predetermined measurement principle. The measurement principle is not particularly limited. The measurement unit 10 at least receives the sample, performs the measurement operation according to the measurement condition 30, and outputs detection signals reflecting the components in the sample. The measurement unit 10 is a chromatograph, for example. There are a plurality of types of chromatographs such as a gas chromatograph and a liquid chromatograph, but the chromatograph is not particularly limited. As an example, the measurement unit 10 is a liquid chromatograph shown in FIG. 2. The liquid chromatograph is a device that uses a liquid as a mobile phase that carries components in a sample and separates a substance for each component utilizing a difference in the properties of the substance.

Figure 2:
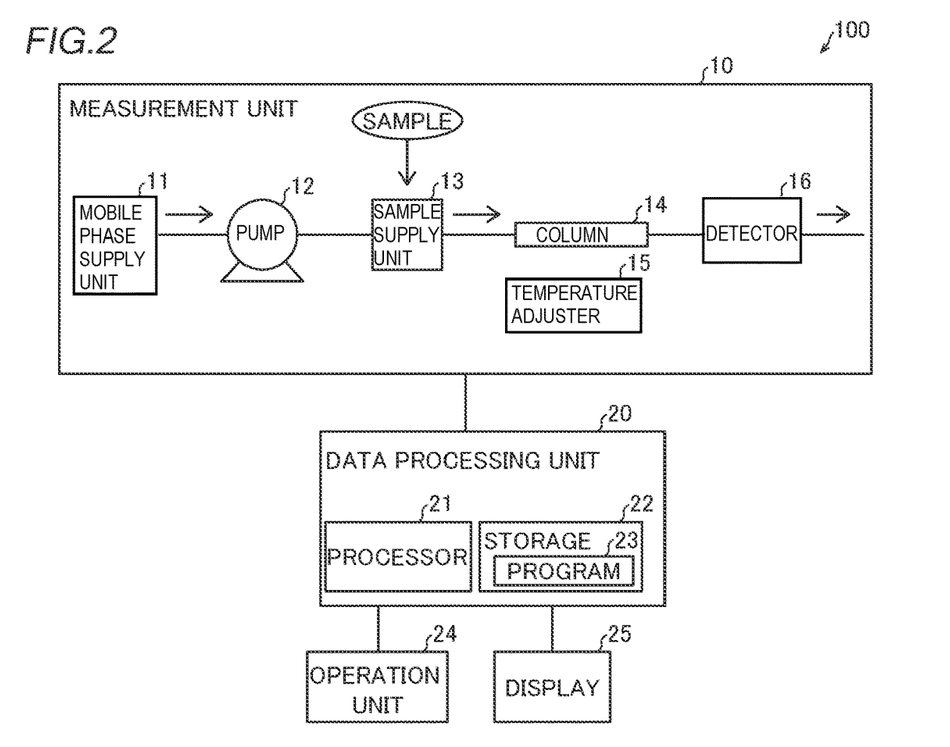
FIG. 2 is a block diagram showing a configuration example of the sample measurement device.

As shown in FIG. 2, the measurement unit 10 includes a mobile phase supply unit 11, a pump 12, a sample supply unit 13, a column 14, a temperature adjuster 15, and a detector 16. The measurement unit 10 outputs the detection signal of the detector 16 to the data processing unit 20.

The data processing unit 20 acquires the measurement data 40 (see FIG. 1) based on the output (the detection signal of the detector 16) of the measurement unit 10. When the measurement unit 10 is a chromatograph, the data processing unit 20 estimates a component identification indicator 45 (see FIG. 1) for identifying each of the components in the measurement data 40 based on the distribution 43 of a measurement quality indicator 42. The data processing unit 20 identifies a peak 41 for each component in a chromatogram 40a (see FIG. 3) that is the measurement data 40. The component identification indicator 45 refers to an indicator that changes for each component that changes with changes of the parameters 31 when the parameters 31 are changed, such as when the analysis conditions are examined. It is possible to ensure the measurement quality by estimating the component identification indicator 45 based on the distribution 43 of the measurement quality indicator 42. The component identification indicator 45 includes at least the retention time rt (see FIG. 5) of the peak 41.

Configuration of Measurement Unit

As shown in FIG. 2, in the measurement unit 10, the mobile phase supply unit 11, the pump 12, the sample supply unit 13, the column 14, and the detector 16 are connected by liquid feed pipes. The mobile phase supply unit 11 adjusts the mobile phase (solvent solution) to a predetermined concentration and supply it. The pump 12 adjusts the flow rate of the mobile phase to feed the mobile phase toward the column 14. The sample supply unit 13 supplies a sample into the mobile phase. The column 14 is a thin tube including a stationary phase. The sample to be fed together with the mobile phase passes through the column 14. At this time, each component contained in the sample interacts with each of the mobile phase and the stationary phase. Due to the interaction that differs for each component, the moving speed in the column 14 changes for each component of the sample. Consequently, the sample reaches the detector 16 after being separated for each component (substance).

The temperature adjuster 15 adjusts the temperature of the column 14. Specifically, the temperature adjuster 15 heats or cools the column 14 such that the column 14 reaches a set temperature. The detector 16 detects each component in the sample that arrives the detector 16 via the column 14. The detection principle for the detector 16 to detect each component of the sample is not particularly limited. The detector 16 detects each component in the sample by measuring the absorption spectrum, the refractive index, or the scattering of light, for example. The detector 16 includes a flow cell. The detector 16 transmits the acquired detection signal of each component to the data processing unit 20 as the output of the measurement unit 10.

Data Processing Unit

The data processing unit 20 is a computer including a processor 21 such as a central processing unit (CPU) and a storage 22 including a volatile and/or non-volatile memory, for example. The storage 22 stores a program 23 for functioning as a data processing unit 20 when the processor 21 executes the program 23. The storage 22 stores various data such as the measurement condition 30 shown in FIG. 1, the measurement data 40, the measurement quality indicator 42 described below, the distribution 43 of the measurement quality indicator 42 described below, the component identification indicator 45, and a model formula 60 described below. The sample measurement device 100 shown in FIG. 2 includes an operation unit 24 and a display 25. The operation unit 24 and the display 25 are electrically connected to the data processing unit 20.

The data processing unit 20 controls each portion of the measurement unit 10. As described above, the data processing unit 20 includes a computer. Specifically, the processor 21 of the data processing unit 20 controls the measurement unit 10 based on the program 23 stored in the storage 22. The data processing unit 20 sets the measurement condition 30 (see FIG. 1) including the plurality of parameters 31 in the measurement unit 10. The data processing unit 20 receives an input operation from an operator via the operation unit 24. The data processing unit 20 controls the display 25 to display a screen for operation and to provide a display of the measurement results, for example.

In an example of the liquid chromatograph shown in FIG. 2, the parameters 31 include more than one of a temperature, a solvent concentration, a pH value, and a column type. The temperature is the temperature of the column 14. The solvent concentration is the concentration of the solvent solution (organic solvent) contained in the mobile phase. The pH value is the pH value of the mobile phase. The column type is a general term for a plurality of parameters such as the inner diameter of a column and the length of a column. The inner diameter of the column and the length of the column are set as separate parameters 31.

Figure 3:
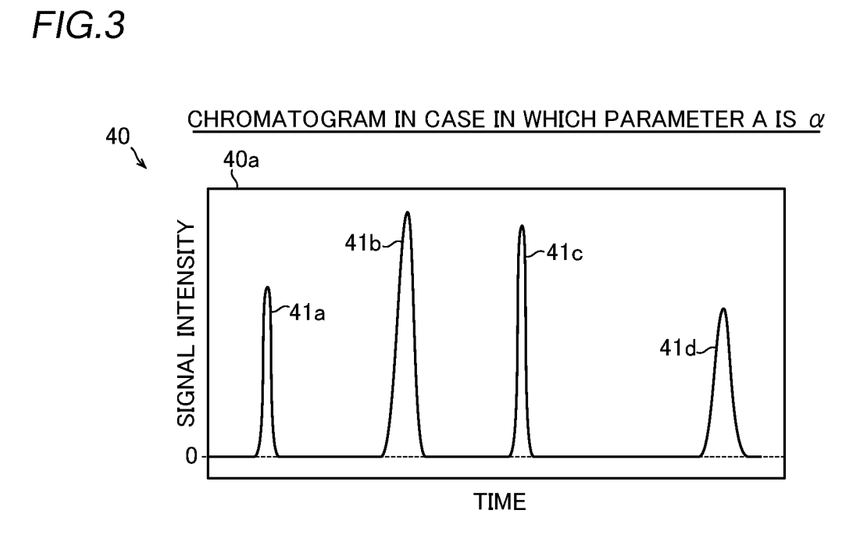
FIG. 3 is a diagram showing a chromatogram in a case in which a parameter is α.
Figure 4:
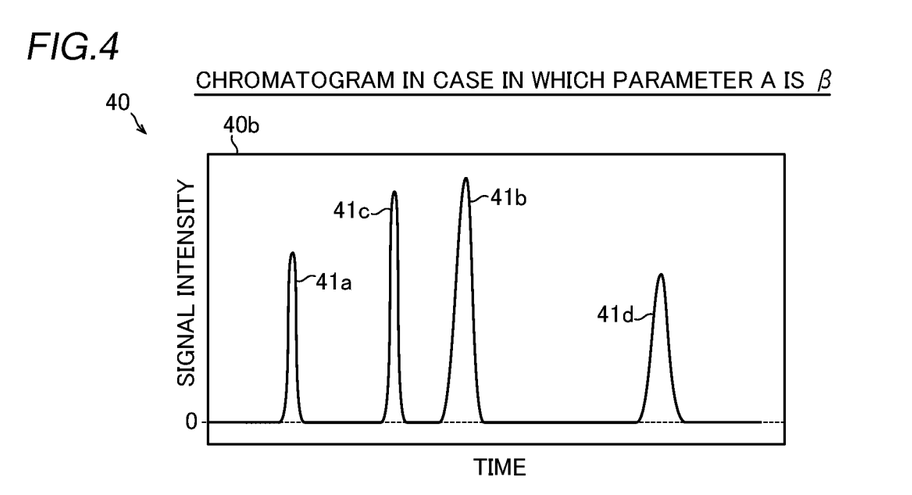
FIG. 4 is a diagram showing a chromatogram in a case in which the parameter is β.

FIGS. 3 and 4 show examples of chromatograms 40a and 40b obtained by measuring a sample containing four components of a first component, a second component, a third component, and a fourth component as a plurality of components. The chromatograms 40a and 40b include a first peak 41a, a second peak 41b, a third peak 41c, and a fourth peak 41d. The first peak 41a, the second peak 41b, the third peak 41c, and the fourth peak 41d correspond to the peaks 41 of the first component, the second component, the third component, and the fourth component, respectively. When the parameters 31 are changed, the position (retention time rt) of each peak 41 changes.

FIG. 3 shows the example of the chromatogram 40a in a case in which the value of the parameter 31 is set to α. In the chromatogram 40a, the peak 41 of each component contained in the sample is formed in the order of the first peak 41a, the second peak 41b, the third peak 41c, and the fourth peak 41d.

FIG. 4 shows the example of the chromatogram 40b in a case in which the value of the parameter 31 is set to β. In the chromatogram 40b, each peak 41 is formed in the order of the first peak 41a, the third peak 41c, the second peak 41b, and the fourth peak 41d. The value β of the parameter 31 is a value different from the value α of the parameter 31.

When the parameter 31 is changed to determine an appropriate measurement condition 30, as shown in FIGS. 3 and 4, even when a sample containing the same component is measured, the position (retention time rt) of each peak 41 in the obtained chromatogram 40a is different between a case in which the parameter A is α and a case in which the parameter A is β. In particular, the positions of the second peak 41b and the third peak 41c may be interchanged between the case in which the parameter A is α and the case in which the parameter A is β. When an inspector confirms such measurement data 40 and identifies each component by the retention time rt, the identification of the component may be erroneous. Therefore, when each component is identified by the retention time rt, it is desired to identify each component even when the subject's skill level is not high.

In order to ensure the measurement quality, it is desired to set an appropriate measurement condition 30 (analysis method) and perform measurement every time under the set measurement condition 30 in the sample measurement device 100.

Therefore, in this embodiment, the sample measurement device 100 creates the distribution 43 of the measurement quality indicator 42 for each measurement condition 30, and acquires a design space 44 (FIG. 7) that is the allowable range of the parameters 31 within the distribution 43 of the measurement quality indicator 42. The design space 44 provides a range of set values for each parameter 31 that allows the measurement quality indicator 42 to be within the allowable range.

In reality, the number of parameters 31 that can be set as the measurement condition 30 is about several to ten, for example. However, optimizing all combinations of all settable parameters 31 is not preferable from the viewpoint of working time and workload. Therefore, in the optimization of the measurement condition 30 (development of the analysis method), screening is performed in advance against all the settable parameters 31.

In evaluating the measurement quality, one or more measurement quality indicators 42 that can quantitatively evaluate the measurement quality may be used depending on the purpose of the measurement. The measurement quality indicator 42 includes at least one of the resolution R or the retention time rt of the peak 41 of the chromatogram 40a, which is the measurement data 40, for example.

Figure 5:
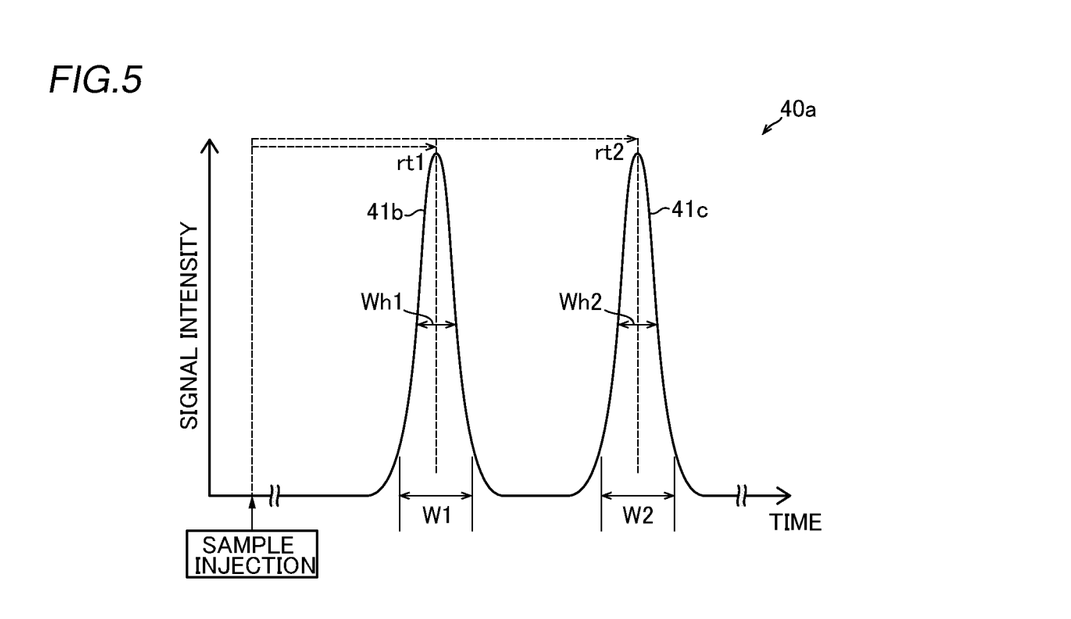
FIG. 5 is a diagram illustrating a measurement quality indicator.

As shown in FIG. 5, the chromatogram 40a as the measurement data 40 is a graph showing time on the horizontal axis and signal intensity on the vertical axis. Each component in the sample is separated in the process of passing through the column 14 of the measurement unit 10, and is detected by the detector 16 at different timings. Therefore, in the chromatogram 40a, the peak 41 of the signal intensity detected by the detector 16 is formed at the timing corresponding to the component contained in the sample. In an example shown in FIG. 5, for convenience, only the second peak 41b and the third peak 41c are shown among the peaks 41.

The resolution R is a scale indicating how much the target peak is separated from the adjacent peak. The resolution R is calculated from the retention time rt and the peak width of the peak 41. For example, the resolution R is expressed by the following equation (1) or the following equation (2) using the peak widths W1 and W2 and the retention times rt1 and rt2 of the peaks 41 (where rt1<rt2).

$$R = 2 \times (rt2 - rt1)/(W1 + W2) \quad (1)$$

$$R = 1.18 \times \{(rt2 - rt1)/(Wh1 + Wh2)\} \quad (2)$$

Note that Wh1 and Wh2 represent half-value widths (full widths at half maximum) of the peaks 41. The resolution R indicates that the adjacent peaks 41 are further separated as the value increases. For example, when the resolution R is 1.5 or more, the adjacent peaks 41 are considered completely separated.

The following shows an example in which the measurement quality indicator 42 is the resolution R. For example, the measurement quality indicator 42 is the minimum value of the resolution R of the measurement data 40 (chromatogram 40a). However, when only the resolution R is used as a reference, the analysis time generally becomes long, and thus the measurement quality indicator 42 may include both the resolution R and the analysis completion time (the retention time rt of the latest peak 41).

As shown in FIG. 1, the data processing unit 20 acquires the distribution 43 of the measurement quality indicator 42 according to the measurement condition 30 based on the measurement data 40. That is, the data processing unit 20 calculates the measurement quality indicators 42 from a plurality of pieces of measurement data 40 obtained under various measurement conditions 30 in which various set values are applied to the plurality of parameters 31, respectively.

The data processing unit 20 acquires the distribution 43 of the measurement quality indicator 42 by regression analysis from the measurement data 40 at a plurality of points as representative values. That is, the distribution 43 of the measurement quality indicator 42 is represented by a regression formula acquired based on a plurality of pieces of measurement data 40 acquired in advance under a plurality of different measurement conditions 30.

The data processing unit 20 acquires a regression formula showing the distribution 43 of the measurement quality indicator 42 from the plurality of measurement quality indicators 42 calculated from the plurality of pieces of measurement data 40, respectively, and the set values of the parameters 31 with which the respective pieces of measurement data 40 are obtained, for example.

Figure 6:
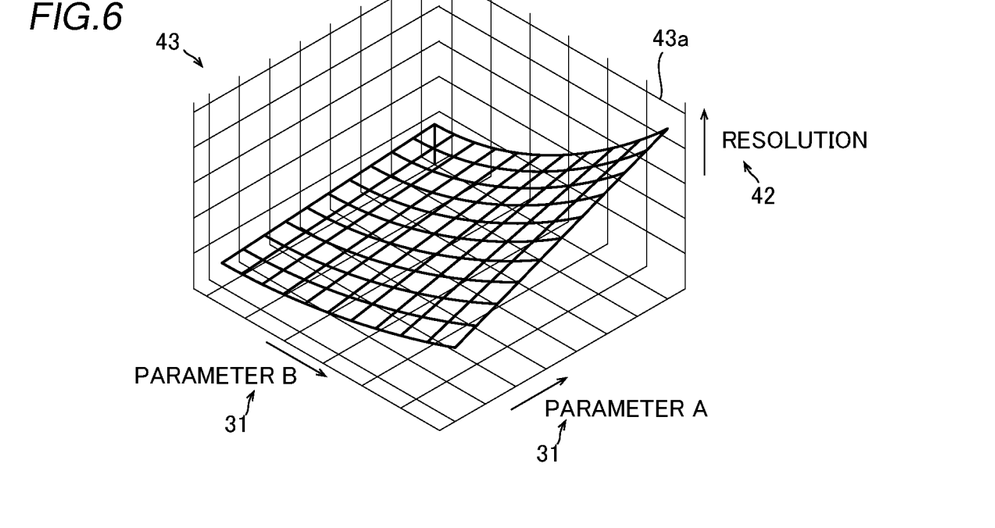
FIG. 6 is a diagram showing a response graph of the retention time as an example of the distribution of the measurement quality indicator.

As shown in FIG. 6, the data processing unit 20 acquires a response graph 43a of the measurement quality indicator 42 with respect to the parameters 31 as the distribution 43 of the measurement quality indicator 42. In an example of FIG. 6, the response graph 43a is a three-dimensional graph obtained by plotting the response surfaces of the measurement quality indicator 42 (resolution R) with respect to two types of parameters 31 (parameter A and parameter B). In FIG. 6, a vertical axis and a horizontal axis in the horizontal direction indicate the set values of the parameter A and the parameter B, respectively, and an axis in the vertical direction indicates the magnitude of the resolution R. An arrow on each axis indicates a direction in which the parameter 31 or the resolution R increases. The response graph 43a is acquired for each component.

Figure 7:
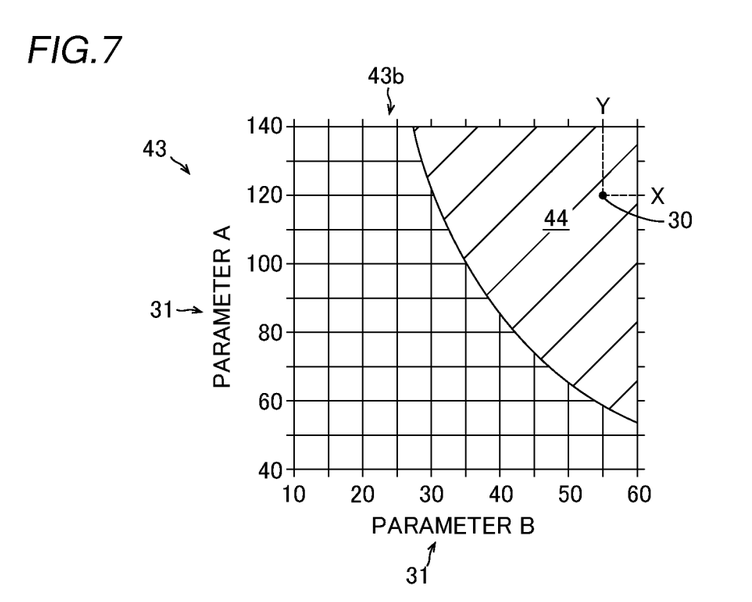
FIG. 7 is a diagram illustrated a design space in a two-dimensional display of the response graph shown in FIG. 6.

As shown in FIG. 7, the allowable range (design space 44) of the measurement quality indicator 42 is acquired by setting a value to be taken by the measurement quality indicator 42 (resolution R) as a threshold from the response graph 43a. FIG. 7 shows a response graph 43b showing the response graph 43a of FIG. 6 in a two-dimensional display, and the vertical axis and the horizontal axis show the set values of the parameter A and the parameter B, respectively. In the response graph 43a of FIG. 6, the data processing unit 20 acquires a region in which the resolution R is equal to or greater than the threshold as the design space 44 (see FIG. 7). The numerical range shown for each axis in FIG. 7 is merely an example for convenience.

One measurement condition 30 that specifies the set value of each parameter 31 (parameter A, parameter B) is expressed as one point specified by the set value of each parameter 31 in the response graph 43a. For example, in FIG. 7, one measurement condition 30 included in the design space 44 is specified by a point (X, Y) of parameter A=X and parameter B=Y. As long as each measurement condition 30 specified by the set value of each parameter 31 (parameter A, parameter B) is included in the design space 44, under the measurement condition 30, it is expected that the measurement data 40 of the measurement quality indicator 42 (resolution R) equal to or greater than the threshold is acquired.

When the analysis conditions suitable for separating each component of the sample are determined while the analysis quality is ensured, it is preferable to select the measurement condition 30 that fits within the design space 44. However, as shown in FIG. 7, the design space 44 merely indicates an allowable range, and there is little information about how the resolution R changes when each parameter 31 is changed in the design space 44. Furthermore, it is difficult to grasp how the retention time rt of the peak 41 of each sample changes when a predetermined parameter 31 (parameter A, for example) is changed in the design space 44.

Therefore, in this embodiment, as shown in FIG. 1, the data processing unit 20 estimates the retention time rt of the peak 41 based on the distribution 43 of the measurement quality indicator 42 and the parameters 31 used when the sample is measured. Furthermore, the data processing unit 20 identifies the peak 41 of each component based on the estimated retention time rt of the peak 41.

Specifically, the data processing unit 20 acquires the model formula 60 showing the relationship between the parameters 31 and the retention time rt of the peak 41. Specifically, the data processing unit 20 calculates each variable (a and b) of the following equation (3) based on the distribution 43 of the measurement quality indicator 42 and the parameters 31 used when the sample is measured to acquire the model formula 60.

$$y = ax + b \quad (3)$$

In the equation (3), y represents the retention time rt, and x represents the parameter 31.

As shown in the above equation (3), the model formula 60 is a formula to replace the relationship between the parameter 31 and the resolution R in the distribution 43 of the measurement quality indicator 42 with the relationship between the parameter 31 and the retention time rt. Using the model formula 60, it is possible to easily acquire a change of the retention time rt of the peak 41 of each component with respect to a change of the parameter 31.

Figure 8:
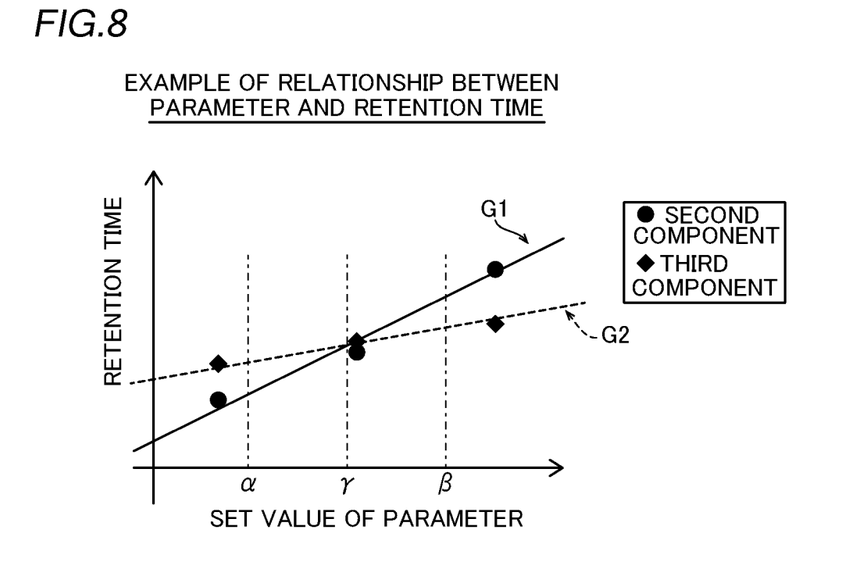
FIG. 8 is a graph illustrating a model formula of a second component and a model formula of a third component.

FIG. 8 shows a graph G1 and a graph G2 showing the model formula 60 of the second component and the model formula 60 of the second component. The graphs G1 and G2 are graphs showing changes in the retention times rt of the second component and the third component in a case in which the parameter A is changed among the plurality of parameters 31. As shown in FIG. 8, the data processing unit 20 plots the parameter 31 and the retention time rt of the second component and acquires a and b when approximation is performed by the above equation (3) to acquire the model formula 60 of the second component. Furthermore, the data processing unit 20 plots the parameter 31 and the retention time rt of the third component and acquires a and b when approximation is performed by the above equation (3) to acquire the model equation 60 of the third component.

The slope (variable a) is different between the model formula 60 of the second component and the model formula 60 of the third component. Therefore, the length of the retention time rt is reversed with a predetermined value γ of the parameter 31 as a boundary. That is, when the value of the parameter 31 is a value α smaller than the predetermined value γ, the retention time rt of the third component is longer than the retention time rt of the second component. That is, the measurement condition 30 becomes the parameter 31 used when the chromatogram 40a shown in FIG. 3 is acquired, and thus the peak 41 (the third peak 41c (see FIG. 3)) of the third component is detected at a position after the position of the peak 41 (the second peak 41b (see FIG. 3)) of the second component.

On the other hand, when the value of the parameter 31 is a value β larger than the predetermined value γ, the retention time rt of the second component is longer than the retention time rt of the third component. That is, the measurement condition 30 becomes the parameter 31 used when the chromatogram 40b shown in FIG. 4 is acquired, and thus the peak 41 (the second peak 41b (see FIG. 4)) of the second component is detected at a position after the position of the peak 41 (the third peak 41c (see FIG. 4)) of the third component. When each peak 41 is identified only by the retention time rt, the component corresponding to the peak 41 may be different (switched) depending on the value of the parameter 31.

Therefore, in this embodiment, the data processing unit 20 acquires the model formula 60 for each parameter 31 with respect to each component. Therefore, even when the parameter 31 is changed to determine the measurement condition 30 suitable for separating each component, the retention time rt of each peak 41 corresponding to the changed parameter 31 can be estimated using the model formula 60 corresponding to the changed parameter 31. Furthermore, the data processing unit 20 can identify the peak 41 of each component in the changed parameter 31 based on the estimated component identification indicator 45 (retention time rt).

Figure 9:
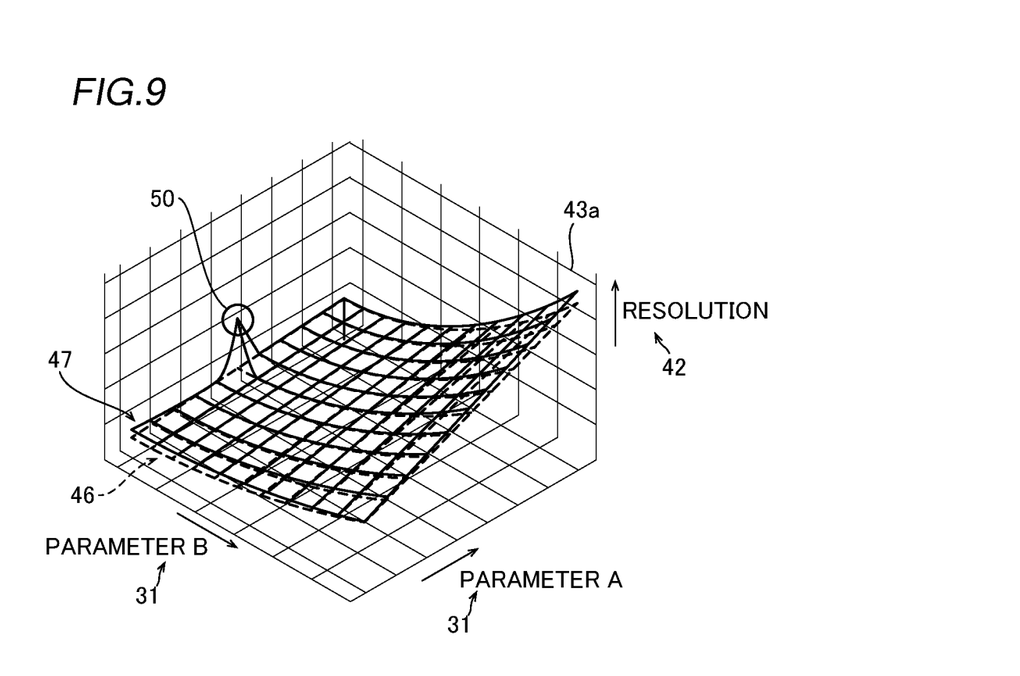
FIG. 9 is a schematic view showing the identification results together with the distribution of the measurement results obtained by actually measuring a sample.

In this embodiment, as shown in FIG. 9, the data processing unit 20 displays, on the display 25, the identification results of the sample identified based on the model formula 60 together with the distribution 46 of the measurement result obtained by actually measuring the sample. Specifically, as shown in FIG. 9, the data processing unit 20 superimposes and displays the distribution 47 of the identification results of the sample identified based on the model formula 60 and the distribution 46 of the measurement results obtained by actually measuring the sample. The distribution 47 of the identification results of the samples identified based on the model formula 60 is displayed together with the distribution 46 of the measurement results obtained by actually measuring the sample such that a region 50 in which the identification results of the sample identified based on the model formula 60 and the measurement results obtained by actually measuring the sample are significantly different from each other can be easily visually recognized. When the region 50 in which the identification results of the sample identified based on the model formula 60 and the measurement results obtained by actually measuring the sample are significantly different from each other is confirmed, the model formula 60 is reacquired. Specifically, the model formula 60 is reacquired by reacquiring the distribution 43 of the measurement quality indicator 42. Thus, the identification accuracy of the sample based on the model formula 60 can be improved. In an example shown in FIG. 9, the distribution 47 of the identification results is shown by solid lines. The distribution 46 of the measurement results obtained by actually measuring the sample is shown by broken lines.

Identification of Measurement Sample

Figure 10:
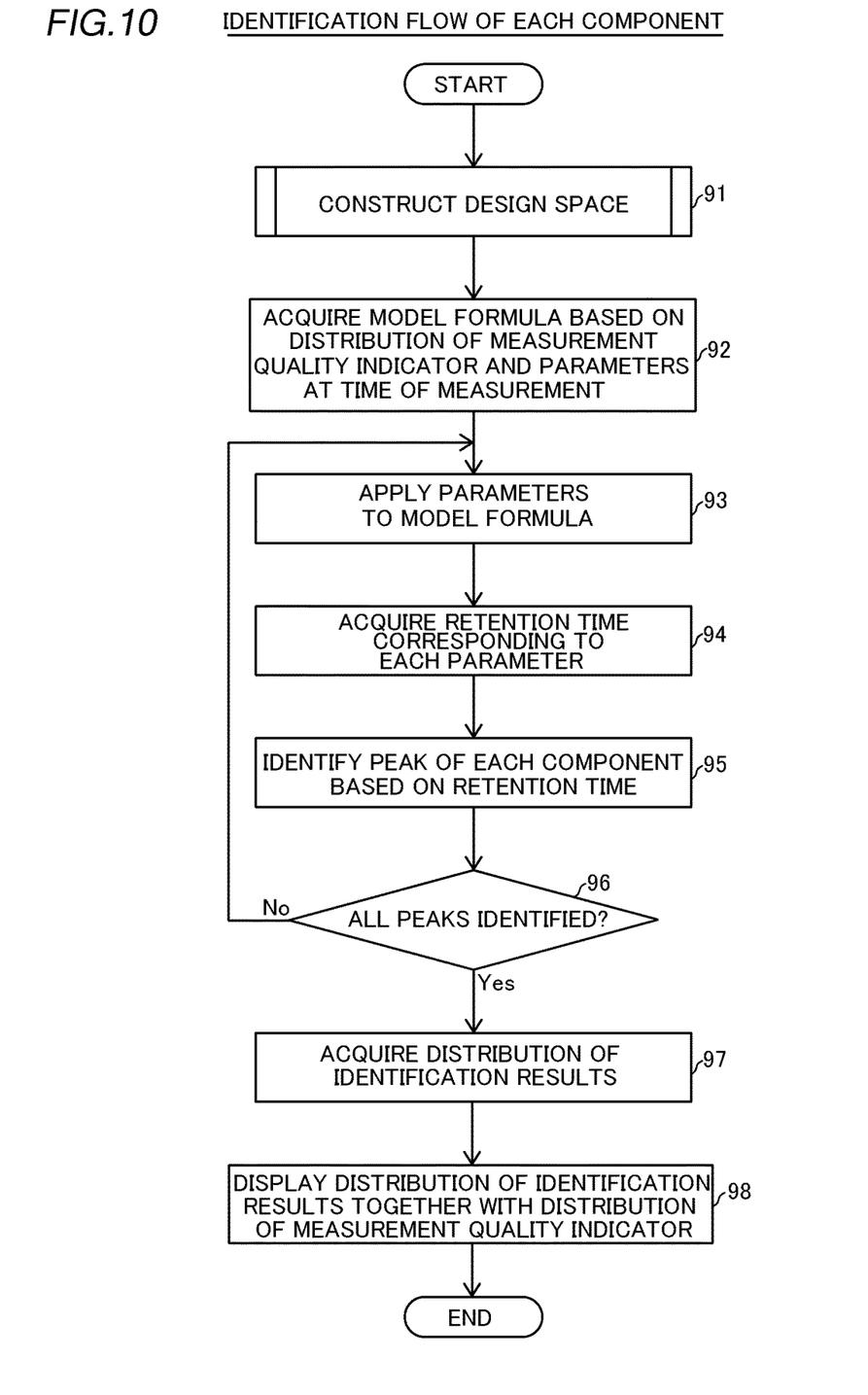
FIG. 10 is a flowchart illustrating a procedure for identifying a measurement sample by the sample measurement device.

The identification of the peak 41 of each component using the sample measurement device 100 according to this embodiment is now described. FIG. 10 is a flowchart showing a procedure for identifying the peak 41 of each component of the measurement data 40 using the acquired model formula 60.

In this embodiment, the data processing unit 20 implements a measurement sample identification method for identifying the peak 41 of each component in the measurement data 40 based on the parameters 31 at the time of sample measurement. Specifically, the measurement sample identification method includes step 102 to acquire the measurement data 40 obtained by measuring the sample containing the plurality of components according to the measurement condition 30 including the plurality of parameters 31, step 103 to acquire the distribution 43 of the measurement quality indicator 42 according to the measurement condition 30 based on the measurement data 40, and step 95 to identify the peak 41 of each component in the measurement data 40 based on the distribution 43 of the measurement quality indicator 42 and the parameters 31 used when the sample is measured.

Description is made below with reference to FIGS. 10 and 11.

In step 91, the data processing unit 20 constructs the design space 44. The flow of a process in which the data processing unit 20 constructs the design space 44 is described later.

In step 92, the data processing unit 20 acquires the model formula 60 based on the distribution 43 of the measurement quality indicator 42 and the parameters 31 used when the sample is measured. The model formula 60 is acquired for each component contained in the sample.

In step 93, the data processing unit 20 applies the parameters 31 used when the sample is measured to the model formula 60.

In step 94, the data processing unit 20 acquires (estimates) the retention time rt corresponding to each of the parameters 31 applied to the model formula 60.

In step 95, the data processing unit 20 identifies the peak 41 of the component based on the acquired (estimated) retention time rt.

In step 96, the data processing unit 20 determines whether or not all the peaks 41 included in the measurement data 40 have been identified. When all the peaks 41 have not been identified, the process returns to step 93. When the identification of all the peaks 41 is completed, the process advances to step 97.

In step 97, the data processing unit 20 creates the distribution 47 of the identification results based on the identification results of the sample identified based on the model formula 60.

In step 98, the data processing unit 20 displays, on the display 25, the distribution 47 of the identification results together with the distribution 46 of the measurement results obtained by actually measuring the sample. Then, the process is terminated.

Construction of Design Space

Figure 11:
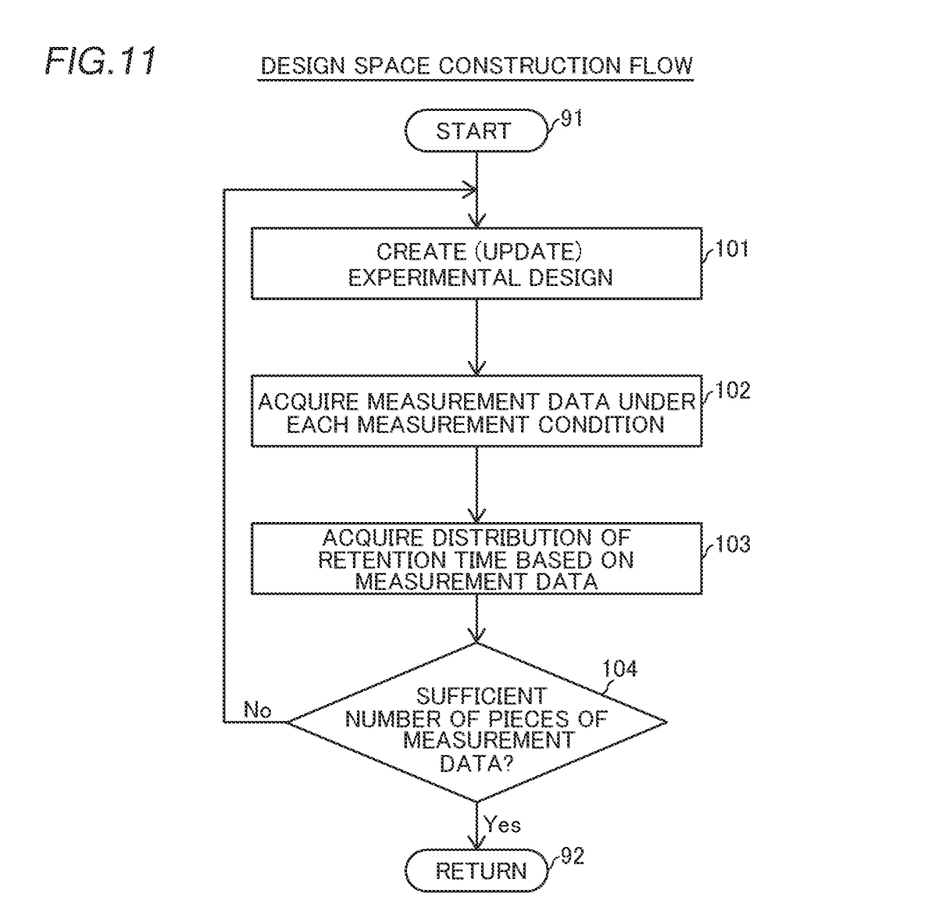
FIG. 11 is a flowchart illustrating a procedure for constructing the design space by the sample measurement device.

FIG. 11 is a flowchart showing a procedure for constructing the design space 44.

When the design space 44 is constructed, an experimental design that defines what kind of measurement condition 30 (what kind of parameter 31 set value) is used to acquire the measurement data 40 is created, and the measurement is performed under a plurality of measurement conditions 30 according to the experimental design. Each measurement data 40 obtained under the plurality of measurement conditions 30 is analyzed such that the distribution 43 of the measurement quality indicator 42 is created. The design space 44 is specified from the distribution 43 of the measurement quality indicator 42 and the set allowable range (threshold) of the measurement quality indicator 42.

The measurement condition 30 under which the measurement has not been performed is estimated (complemented) by regression analysis. Therefore, as a general rule, as the number of pieces of measurement data 40 increases, the reliability of the distribution 43 of the measurement quality indicator 42 is improved.

In step 101, the experimental design is created. That is, a plurality of measurement conditions 30 under which the sample measurement device 100 should perform actual measurement are set. In the plurality of measurement conditions 30, some or all of the values of the parameters 31 are different from each other.

In step 102, the same sample is measured by the sample measurement device 100 under each of the plurality of measurement conditions 30 defined by the experimental design. The data processing unit 20 (see FIG. 1) acquires a plurality of pieces of measurement data 40 based on the experimental design that defines a plurality of different measurement conditions 30 under which the measurement should be performed. That is, the measurement unit 10 (see FIG. 1) performs the measurement a plurality of times according to the individual measurement conditions 30 defined by the experimental design. The data processing unit 20 generates the plurality of pieces of measurement data 40 (measurement results) having different measurement conditions 30 based on the output of the measurement unit 10.

In step 103, the data processing unit 20 acquires the distribution 43 (see FIG. 6) of the measurement quality indicator 42 (resolution R) according to the measurement condition 30 based on the obtained measurement data 40.

In the above example, the data processing unit 20 calculates the distribution 43 of the measurement quality indicator 42 as a regression formula by performing regression analysis on the plurality of pieces of measurement data 40 having different measurement conditions 30. When the distribution 43 of the measurement quality indicator 42 is acquired, the design space 44 (see FIG. 7) in the distribution 43 of the measurement quality indicator 42 is specified based on a preset threshold.

In step 104, it is determined whether or not the number of pieces of measurement data 40 is sufficient. When the number of pieces of measurement data 40 is not sufficient, the process returns to step 101, and the experimental design is updated. That is, the measurement condition 30 under which the next measurement should be performed is newly set.

In this case, the data processing unit 20 updates the distribution 43 (see FIG. 6) of the measurement quality indicator 42 in step 103 with the acquisition of the new measurement data 40 in step 102. When the distribution 43 of the measurement quality indicator 42 is updated, the model formula 60 showing the relationship between the parameters 31 and the retention time rt also changes. Therefore, the data processing unit 20 acquires the model formula 60 showing the relationship between the parameters 31 and the retention time rt in step 92 after the acquisition of the distribution 43 of the measurement quality indicator 42 is completed.

Advantages of this Embodiment

In this embodiment, the following advantages are obtained.

In this embodiment, as described above, the sample measurement device 100 includes the measurement unit 10 configured to measure the sample containing the plurality of components according to the measurement condition 30 including the plurality of parameters 31, and the data processing unit 20 configured to acquire the measurement data 40 based on the output of the measurement unit 10, and the data processing unit 20 is configured to acquire the distribution 43 of the measurement quality indicator 42 according to the measurement condition 30 based on the measurement data 40, and to identify the peak 41 of each of the components in the measurement data 40 based on the distribution 43 of the measurement quality indicator 42 and the parameters 31 used when the sample is measured. Accordingly, the position of the peak 41 of each of the components in the measurement data 40 can be predicted based on the distribution 43 of the measurement quality indicator 42 and the parameters 31 used when the sample is measured, and thus even when the measurement condition 30 is changed, the position of the peak 41 of each of the components can be predicted. Consequently, the peak 41 of each of the components can be identified based on the measurement condition 30, and thus the peak 41 of each of the components contained in the sample can be identified regardless of the skill level of the inspector.

In this embodiment, as described above, the measurement unit 10 includes the chromatograph, and the data processing unit 20 is configured to identify the peak 41 for each of the components in the chromatogram 40a and/or the chromatogram 40b, which is the measurement data 40, by estimating the component identification indicator 45 to identify each of the components in the measurement data 40 based on the distribution 43 of the measurement quality indicator 42. Accordingly, even when the analysis conditions are changed in the chromatograph, the peak 41 for each of the components can be identified based on the component identification indicator 45. Consequently, unlike the configuration in which a measurer identifies the peak 41 of each component by checking the measurement data 40, the peak 41 of each component can be identified without the measurer making a judgment.

In this embodiment, as described above, the component identification indicator 45 includes at least the retention time rt of the peak 41, and the data processing unit 20 is configured to estimate the retention time rt of the peak 41 based on the distribution 43 of the measurement quality indicator 42 and the parameters 31 used when the sample is measured, and to identify the peak 41 of each of the components based on the estimated retention time rt of the peak 41. Accordingly, for example, even when a sample containing components with peak 41 positions (retention time rt) interchanged by the parameters 31 is measured, the peak 41 of each component in the parameters 31 at the time of measurement can be identified. Consequently, even when the values of the parameters 31 are set to various values in order to determine the optimum measurement condition 30 for sample separation, and measurement is performed, mis-identification of the peak 41 of each component can be significantly reduced or prevented as compared with a case in which the inspector identifies the peak 41 of each component by checking the peak 41.

In this embodiment, as described above, the data processing unit 20 is configured to acquire the model formula 60 showing the relationship between the parameters 31 and the retention time rt of the peak 41, and to estimate the retention time rt of the peak 41 based on the acquired model formula 60 to identify the peak 41 of each of the components. Accordingly, the parameters 31 are applied to the model formula 60 such that the retention time rt of the peak 41 can be easily acquired.

In this embodiment, as described above, the sample measurement device 100 further includes the display 25, and the data processing unit 20 is configured to display, on the display 25, the identification results of the sample identified based on the model formula 60 together with the distribution 46 of the measurement results obtained by actually measuring the sample. Accordingly, the identification results of the sample identified based on the model formula 60 is compared with the distribution 43 of the measurement quality indicator 42 such that the degree of accuracy of the identification results based on the model formula 60 can be visually grasped. Consequently, for example, when the results based on the model formula 60 greatly deviate from the distribution 43 of the measurement quality indicator 42, a case in which the peak 41 cannot be identified and/or a case in which the peak 41 is erroneously determined, for example, can be easily grasped visually.

In this embodiment, as described above, the parameters 31 include more than one of a temperature, a solvent concentration, a pH value, and a column type. Accordingly, the relationship between these various parameters 31 and the retention time rt can be easily acquired.

In this embodiment, as described above, the measurement sample identification method includes step 102 to acquire the measurement data 40 obtained by measuring the sample containing the plurality of components according to the measurement condition 30 including the plurality of parameters 31, step 103 to acquire the distribution 43 of the measurement quality indicator 42 according to the measurement condition 30 based on the measurement data 40, and step 95 to identify the peak 41 of each of the components in the measurement data 40 based on the distribution 43 of the measurement quality indicator 42 and the parameters 31 used when the sample is measured. Accordingly, similarly to the sample measurement device 100, it is possible to provide the measurement sample identification method capable of identifying the peak 41 of the component contained in the sample regardless of the skill level of the inspector.

Modified Examples

The embodiment disclosed this time must be considered as illustrative in all points and not restrictive. The scope of the present invention is not shown by the above description of the embodiment but by the scope of claims for patent, and all modifications (modified examples) within the meaning and scope equivalent to the scope of claims for patent are further included.

For example, while the example in which the data processing unit 20 acquires the regression formula showing the distribution 43 of the measurement quality indicator 42 has been shown in the aforementioned embodiment, the present invention is not limited to this. For example, the data processing unit 20 may apply a model formula (a formula different from the model formula 60) created in advance to a plurality of pieces of measurement data 40 acquired under a plurality of measurement conditions 30, estimate the measurement data 40 acquired under another measurement condition 30 under which actual measurement has not been performed, and apply the above equation (2) or the above equation (3) to the distribution of the estimated measurement data 40 to acquire the distribution 43 of the measurement quality indicator 42. In this case, for example, Bayesian estimation is used to estimate the measurement data 40 that has not been actually measured. In this case, the estimated measurement data 40 has a probability distribution, and thus the data processing unit 20 can acquire the distribution 43 of the measurement quality indicator 42 as the distribution of the resolution R included in a predetermined confidence interval, for example.

While the example in which the measurement unit 10 includes the chromatograph has been shown in the aforementioned embodiment, the present invention is not limited to this. In the present invention, the measurement unit 10 may be a measurement device other than the chromatograph. For example, the measurement unit 10 may be a mass spectrometer.

While the example in which at least one of the resolution R or the retention time rt is used as the measurement quality indicator 42 has been shown in the aforementioned embodiment, the present invention is not limited to this. In the present invention, as the measurement quality indicator 42, an indicator other than the number of peaks 41 in the measurement data 40, the resolution R such as a separation coefficient, and the retention time rt may be used, or those indicators may be combined.

While the example in which the data processing unit 20 identifies the peak 41 for each component in the chromatogram 40a and/or the chromatogram 40b by estimating the component identification indicator 45 has been shown in the aforementioned embodiment, the present invention is not limited to this. For example, the data processing unit 20 may be configured to construct a design space 44 in which the measurement quality indicator 42 is the retention time rt to identify the peak 41 for each component based on the constructed design space 44.

While the example in which the component identification indicator 45 is the retention time rt of the peak 41 has been shown in the aforementioned embodiment, the present invention is not limited to this. For example, the component identification indicator 45 may include the order in which the peak 41 of each component is formed. When the order in which the peak 41 of each component is formed is known for each parameter 31, the peak 41 of each component can be identified based on the measurement data 40.

While the example in which the parameters 31 include more than one of a temperature, a solvent concentration, a pH value, and a column type has been shown in the aforementioned embodiment, the present invention is not limited to this. In the present invention, a parameter other than a temperature, a solvent concentration, a pH value, and a column type may be used as the parameter 31.

While the example in which the identification results of the sample identified based on the model formula 60 is displayed on the display unit 25 together with the distribution 46 of the measurement results obtained by actually measuring the sample has been shown in the aforementioned embodiment, the present invention is not limited to this. For example, the identification results of the sample may be displayed independently and separately from the distribution 46 of the measurement results obtained by actually measuring the sample. The identification results of the sample do not necessarily have to be displayed on the display 25 of the sample measurement device 100. For example, the identification results of the sample may be transmitted to another computer or a display terminal, or may be printed.

While the example in which the data processing unit 20 includes a single computer has been shown in the aforementioned embodiment, the present invention is not limited to this. In the present invention, the data processing unit 20 may be configured by a combination of a plurality of computers. For example, step 102 to acquire the measurement data 40 shown in FIGS. 10 and 11, step 103 to acquire the distribution 43 of the measurement quality indicator 42, step 92 to acquire the model formula 60, and step 95 to identify the peak 41 of each component may be performed by separate computers, respectively. At this time, the data processing unit 20 includes a plurality of computers, and the process operations in step 92, step 95, step 102, and step 103 described above can be performed by mutual communication between the computers.

Aspects

It will be appreciated by those skilled in the art that the exemplary embodiments described above are specific examples of the following aspects.

(Item 1)

A sample measurement device comprising:
a measurement unit configured to measure a sample containing a plurality of components according to a measurement condition including a plurality of parameters; and
a data processing unit configured to acquire measurement data based on an output of the measurement unit; wherein
the data processing unit is configured to:
  acquire a distribution of a measurement quality indicator according to the measurement condition based on the measurement data; and
  identify a peak of each of the components in the measurement data based on the distribution of the measurement quality indicator and the parameters used when the sample is measured.

(Item 2)

The sample measurement device according to item 1, wherein
the measurement unit includes a chromatograph; and
the data processing unit is configured to identify the peak for each of the components in the chromatogram, which is the measurement data, by estimating a component identification indicator to identify each of the components in the measurement data based on the distribution of the measurement quality indicator.

(Item 3)

The sample measurement device according to item 2, wherein
the component identification indicator includes at least a retention time rt of the peak; and
the data processing unit is configured to estimate the retention time of the peak based on the distribution of the measurement quality indicator and the parameters used when the sample is measured, and to identify the peak of each of the components based on the estimated retention time of the peak.

(Item 4)

The sample measurement device according to item 3, wherein the data processing unit is configured to acquire a model formula showing a relationship between the parameters and the retention time of the peak, and to estimate the retention time of the peak based on the acquired model formula to identify the peak of each of the components.

(Item 5)

The sample measurement device according to item 4, further comprising:
a display; wherein
the data processing unit is configured to display, on the display, an identification result of the sample identified based on the model formula together with a distribution of a measurement result obtained by actually measuring the sample.

(Item 6)

The sample measurement device according to any one of items 2 to 5, wherein the parameters include more than one of a temperature, a solvent concentration, a pH value, and a column type.

(Item 7)

A measurement sample identification method comprising:
acquiring measurement data obtained by measuring a sample containing a plurality of components according to a measurement condition including a plurality of parameters;
acquiring a distribution of a measurement quality indicator according to the measurement condition based on the measurement data; and
identifying a peak of each of the components in the measurement data based on the distribution of the measurement quality indicator and the parameters used when the sample is measured.

DESCRIPTION OF REFERENCE NUMERALS

10: measurement unit
20: data processing unit
25: display
30: measurement condition
31: parameter
40: measurement data
40a, 40b: chromatogram
41: peak of the component
42: measurement quality indicator
43: distribution of the measurement quality indicator
45: component identification indicator
60: model formula
rt: retention time
100: sample measurement device

The invention claimed is:

1. A sample measurement device comprising:
a measurement unit including a chromatograph or a mass spectrometer configured to measure a sample containing a plurality of components according to a measurement condition including a plurality of parameters; and
a processor configured to acquire measurement data based on an output of the measurement unit;
wherein the processor is configured to:
  acquire a distribution of a measurement quality indicator according to the measurement condition based on the measurement data;
  generate a component identification indicator by estimating retention times for each of components based on the distribution of the measurement quality indicator and the parameters used when the sample is measured; and
  identify a peak of each of the components in the measurement data based on the component identification indicator.

2. The sample measurement device according to claim 1,
wherein the measurement unit includes the chromatograph; and
wherein the processor is configured to identify the peak for each of the components in the chromatograph as the measurement data, by estimating the component identification indicator to identify each of the components in the measurement data based on the component identification indicator.

3. The sample measurement device according to claim 2, wherein the component identification indicator includes at least a retention time of the peak, and
wherein the processor is configured to estimate the retention time of the peak based on the distribution of the measurement quality indicator and the parameters used when the sample is measured, and to identify the peak of each of the components based on the estimated retention time of the peak.

4. The sample measurement device according to claim 3, wherein the processor is configured to acquire a model formula showing a relationship between the parameters and the retention time of the peak, and to estimate the retention time of the peak based on the acquired model formula to identify the peak of each of the components.

5. The sample measurement device according to claim 4, further comprising:
a display,
wherein the processor is configured to display, on the display, an identification result of the sample identified based on the model formula together with a distribution of a measurement result obtained by actually measuring the sample.

6. The sample measurement device according to claim 2, wherein the parameters include more than one of a temperature, a solvent concentration, a pH value, and a column type.

7. The sample measurement device according to claim 1, wherein the measurement unit is configured to measure the sample containing the plurality of components including components with peak positions interchanged when the plurality of parameters ane is changed, and
wherein the processor is configured to identify the peak of each of the components in the measurement data by predicting a peak position of each of the components based on the distribution of the measurement quality indicator and the parameters used when the sample is measured, when the plurality of parameters aneis changed such that the peak positions are interchanged.

8. The sample measurement device according to claim 1, wherein the processor is configured to generate a design space in which the measurement quality indicator is equal to or greater than a threshold in the distribution of the measurement quality indicator, and to identify the peak of each of the components in the measurement data based on the distribution of the measurement quality indicator within the design space and the parameters used when the sample is measured.

9. The sample measurement device according to claim 8, wherein the processor is configured to estimate a measurement condition under which measurement has not been performed by regression analysis to acquire the distribution of the measurement quality indicator.

10. A measurement sample identification method comprising:
acquiring measurement data obtained by measuring a sample containing a plurality of components according to a measurement condition including a plurality of parameters;
acquiring a distribution of a measurement quality indicator according to the measurement condition based on the measurement data;
generating a component identification indicator by estimating retention times for each of components based on the distribution of the measurement quality indicator and the parameters used when the sample is measured; and
identifying a peak of each of the components in the measurement data based on the component identification indicator.

* * * * *